United States Patent
Tsunemori et al.

(10) Patent No.: US 8,524,359 B2
(45) Date of Patent: Sep. 3, 2013

(54) EXTERIOR HEAT INSULATION PANEL

(75) Inventors: Itsuki Tsunemori, Hofu (JP); Kazuo Nagahashi, Hofu (JP)

(73) Assignee: Kaisui Chemical Industrial Co., Ltd., Yamaguchi (JP)

(*) Notice: Subject to any disclaimer, the term of this patent is extended or adjusted under 35 U.S.C. 154(b) by 170 days.

(21) Appl. No.: 12/737,915

(22) PCT Filed: Aug. 28, 2009

(86) PCT No.: PCT/JP2009/004245
§ 371 (c)(1),
(2), (4) Date: Feb. 25, 2011

(87) PCT Pub. No.: WO2010/023957
PCT Pub. Date: Mar. 4, 2010

(65) Prior Publication Data
US 2011/0151182 A1  Jun. 23, 2011

(30) Foreign Application Priority Data
Aug. 29, 2008 (JP) ................................. 2008-220957

(51) Int. Cl.
*B32B 3/26* (2006.01)
*B32B 3/06* (2006.01)
*B32B 3/00* (2006.01)

(52) U.S. Cl.
USPC .............. 428/304.4; 428/307.3; 428/312.2; 428/312.6; 428/314.2; 428/315.9

(58) Field of Classification Search
USPC .......... 428/304.4, 307.3, 312.2, 312.6, 314.2, 428/315.9
See application file for complete search history.

(56) References Cited

U.S. PATENT DOCUMENTS
2,421,721 A * 6/1947 Smith et al. ............... 52/612

FOREIGN PATENT DOCUMENTS

| JP | 55003325 A | * | 1/1980 |
| JP | 2002-180563 | | 6/2002 |
| JP | 2005-145771 | | 6/2005 |
| JP | 2006-283447 | | 10/2006 |
| JP | 2008-008041 | | 1/2008 |
| JP | 2008-069574 | | 3/2008 |

OTHER PUBLICATIONS

Translation of JP 2008-008041. See IDS filed Feb. 25, 2011 for date and inventor.*
Translation of JP 2008-069574. See IDS filed Feb. 25, 2011 for date and inventor.*
Abstract of JP 55-003325, see above foe date and inventor.*

* cited by examiner

*Primary Examiner* — Victor Chang
(74) *Attorney, Agent, or Firm* — Muramatsu & Associates

(57) ABSTRACT

An exterior heat insulation panel is disclosed which uses vaporization heat of water. The exterior heat insulation panel is installed on the surface of a roof or walls of a structure and is used for cooling and air-conditioning of structures, particularly, to an exterior heat insulation panel which can achieve high efficiency and energy-saving. The exterior heat insulation panel includes a surface layer having a continuous capillary tube structure and a non-capillary tube void structure made of porous aggregate combined by a hydrophilic binding component, and a foamed organic resin type of heat-retaining board having closed pores. The heat-retaining board and the surface layer are integrated by compression molding.

8 Claims, 2 Drawing Sheets

EXTERIOR HEAT INSULATION PANEL

This application is a national stage of International Application No. PCT/JP2009/004245, filed Aug. 28, 2009, which claims the benefit of foreign filing priority based on Japanese Patent Application No. 2008-220957, filed Aug. 29, 2008, the entire contents of which are incorporated herein by reference.

BACKGROUND OF THE INVENTION

1. Field of the Invention

The present invention relates to an exterior heat insulation panel which uses vaporization heat of water and is used for cooling and air-conditioning of structures, particularly, to an exterior heat insulation panel which can achieve high efficiency and energy-saving.

2. Description of Related Art

Recently, global warming and urban heat islands due to excessive use of fossil fuels have become urgent issues to be resolved. In this context, in order to deal with the issue, various new energies and energy saving systems have been proposed so far.

The roof, walls, and the like of a building readily reach a high temperature during daytime since they are exposed to direct sunlight for a long time. Particularly, during the summer when solar radiation hours are long, the heat absorbed from the surface of a roof and walls is transferred to inside the structure, thereby elevating the room temperature. The heat transferred from the surface of the roof and walls to a structure is accumulated, thereby decreasing air-conditioning efficiency. Currently, among widely spread energy-saving systems of buildings, an exterior heat insulation method can be exemplified as one of the most efficient methods.

The exterior heat insulation method is a method of providing heat insulation layers outside a building. According to this method, structures having a large heat capacity, such as a concrete structure, are protected from outside heat and cold; therefore, it is possible to suppress a large rise in temperature due to solar radiation heat during daytime of the summer or a drop in temperature due to the accumulation of cold air at night time in winter in buildings. Meanwhile, the interior temperature of a building is easily maintained by the large heat capacity of the building itself due to the effect of exterior heat insulation. Accordingly, compared to the conventional interior heat insulation, that is, the method of providing heat insulation layers inside a building, it is possible to drastically reduce the energy required for air-conditioning and obtain an advantage that room temperature can be easily maintained to make a pleasant environment.

The exterior heat insulation method has been limited to costly construction methods because of the needs of fire resistance of exterior walls by now, thus, exterior heat-insulated buildings have been spread slowly. However, 30 years or more of performance results in Japan, Europe, and America, introduction of inexpensive exterior heat insulation methods with confirmed fire resistance performances, and measures for energy-saving effect based on the Kyoto Protocol are providing impetus for the recent increase in the new construction and renovation of exterior heat-insulated buildings.

As a general method of the exterior heat insulation method, heat-retaining boards such as foamed polyethylene and foamed polystyrene are provided on the surface of a roof or walls, and surface layers such as cinder concrete and pressing blocks are provided outside thereof for the purpose of prevention of ultraviolet degradation of the heat-retaining boards, thereby achieving improvement of fire resistance, and antiscattering, in order to protect the heat-retaining boards.

However, such a method only has a heat-insulating effect of inhibiting heat-transfer by heat transmission resistance of the heat-retaining boards and is not able to actively cool the surface of a roof. Also, the surface layer reaches 65° C. in the summer, and the heat accumulated in the surface layer is leaked through the heat-retaining board and transferred to the building structure and then accumulated therein. The heat accumulated in this manner is gradually transferred inside the structure even when there is no solar radiation such as at night time or during cloudy weather. In other words, this method is not effective as a fundamental measure of energy-saving in air-conditioning and improving habitability. In addition, the method has a problem in that it encourages to form heat islands due to heat radiation from the surface layer at high temperature.

As a method of directly removing heat from a structure, there is a method of so-called "water sprinkling" using vaporization heat of water. "Water sprinkling" is one of the effective methods of actively reducing heat and has been customarily used in many places. Also, "water sprinkling" has been empirically proved to be highly effective in cooling and is drawing attention recently as means for achieving reduction of energy in air-conditioning by cooling a building.

However, when sprinkled or supplied to the surface of a roof or walls of a structure, water immediately flows down due to the slope of the structure. Moreover, the cooling effect is obtained only at the site of the structure to which the water contacts. That is, in order to stably cool the entire surface of a roof and walls evenly and for a long period of time, it is necessary for building materials to have a water retentive function. Accordingly, there have been various suggestions regarding such water retentive building materials. For instance, as the most frequently found example, there is a pavement with water-permeability and water retentivity. The pavement with water-permeability and water retentivity is drawing attention as a countermeasure, which uses rainwater effectively, against urban heat islands. Regarding the water retentive building material, several inventions and devices are also disclosed in addition to the example.

For example, Japanese Unexamined Application Publication No. 2006-283447 discloses an invention under the title of "Water retentive pavement structure", the invention relating to a pavement structure having water retentivity which can reduce road surface temperature using vaporization heat of water.

The invention disclosed in Japanese Unexamined Application Publication No. 2006-283447 is characterized in that rainwater is stored on a water impermeable layer, an aggregate layer mixed with a water retentive material is provided on the water impermeable layer, a water absorbing material is laid on the aggregate layer, and a water retentive block and a water permeable block are intermingled and arranged on the water absorbing material.

In this configuration, the rainwater, which flows into the aggregate layer mainly by permeating through the water permeable block, evaporates through voids of the aggregate layer due to temperature elevation of road surface, and thus generated vaporization heat yields an action of suppressing temperature elevation of the road surface.

Also, Japanese Unexamined Application Publication No. 2005-145771 discloses an invention under the title of "Water permeable block", the invention relating to a block which improves a water permeable function, a water retentive function, and a water purifying function and which can achieve limestone recycling.

The invention disclosed in Japanese Unexamined Application Publication No. 2005-145771 is characterized in that cement is mixed with coal and coal ash and then formed into a block shape.

A block in this configuration has a high water permeable function, a water retentive function, and a water purifying function, and therefore it is possible to use the block as a water retaining and evaporative cooling material for counteracting against urban heat island. It is also possible to recycle the fly ash which has been subjected to the waste disposal.

However, for the water retentive building material used in the surface of a roof and walls, conflicting performances such as water retentivity, strength, freeze-thaw resistance, and weight are required. Generally, it is very difficult to balance these performances. For example, in order to improve a water retention rate of water retentive building materials (an amount (volume) of water retained with respect to volume of building material), small voids are formed in the building material or a porous aggregate having high void ratio is used; however, in this case, the compression tensile strength, and bending strength of water retentive building materials, significantly deteriorate. Particularly, strength against impact load is significantly deteriorated, thereby causing difficulty even in light walking. Therefore, sites to which the water retentive building material can be applied are greatly limited. Generally, when the ratio of void volume to the building material volume is the same, it is confirmed that there is a tendency that the smaller the void, the higher the strength. However, when water in the void is frozen and expanded in the winter, the water retentive building material is cracked or broken. There is a method of thickening the water retentive material by reducing the water retention rate of water retentive building materials, but in this case, while strength and water retentivity can be secured, weight of the water retentive building material itself increases. Many existing buildings have low load resistance, so it is difficult for the above method to be applied to the existing buildings accounting for more than half of structures.

As described so far, though confirmed to be effective to some degree, the existing water retentive building material disclosed in the patent publications noted above is far from practical for use.

SUMMARY OF THE INVENTION

The present invention has been made to cope with the above-described situation, and an advantage of some aspects of the invention is to provide an inexpensive and lightweight exterior heat insulation panel having sufficient strength, water retentivity, and freeze-thaw resistance.

According to an aspect of the invention, there is provided an exterior heat insulation panel installed on the surface of a roof or walls of a structure, the exterior heat insulation panel including: a surface layer having a continuous capillary tube structure and a non-capillary tube void structure. The continuous capillary tube structure is made of a porous aggregate combined by a hydrophilic binding component. The non-capillary tube void structure is formed between particles of the porous aggregate; and a foamed organic resin type of heat-retaining board with closed pores, characterized in that the heat-retaining board and the surface layer are integrated by compression molding.

In the exterior heat insulation panel having this structure, water supplied to the exterior surface by rain, water sprinkler, or water supply system permeates into the entire surface layer through voids between the porous aggregates and is accumulated in the porous aggregate. The compression molding of the porous aggregate makes it possible to secure continuity of capillary tube structures in interconnected portions. In this configuration, water in the surface layer is not affected by inhibition of capillary tube continuity due to the binding component, easily moves through the capillary tube, and reaches the exterior surface of the surface layer evenly. That is, in the exterior heat insulation panel with the structure noted above, when water begins to evaporate from the exterior surface of the exterior heat insulation panel due to solar radiation or the like, the water accumulated in the capillary tube structure of the porous aggregate is supplied to the exterior surface of the exterior heat insulation panel through the continuous capillary tube structure in the porous aggregate and the contact portion of the porous aggregate. Accordingly, temperature around the surface layer is remarkably reduced due to the vaporization heat of water, and thereby solar radiation heat is actively removed. Also, the voids in the porous aggregates function as retreat for water in the winter, and thus prevent the water from being frozen in the surface layer. The heat-retaining board protects the surface of a roof or walls of structures from outside heat and cold and improves the strength of the exterior heat insulation panel. When integrated by the compression molding, the heat-retaining board and the surface layer are joined due to the adhesive function of the binding component. Under this condition, since the porous aggregate of the surface layer cuts into the surface of the heat-retaining board, the adhesion surface increases, and thereby the adhesive strength between the heat-retaining board and the surface layer is further strengthened. The time and cost required for manufacturing the exterior heat insulation panel having this structure is further reduced compared to a case where the exterior heat insulation panel is manufactured by a method in which the individually manufactured surface layer and heat-retaining board are integrated by an adhesive. In addition, the heat conductivity and specific heat in the surface layer decreases due to the porous structure.

In the exterior heat insulation panel, a thickness of the surface layer is 5 mm to 60 mm, a water retention rate of the surface layer is 20% to 50% in terms of volume ratio, and a specific gravity of the dry surface layer is 0.4 to 1.2.

In the exterior heat insulation panel having this structure, since the thickness of the surface layer is 5 mm to 60 mm, it is possible to secure strength sufficient for light walking and a fireproof performance against external flames, and the heat-retaining board is protected by blocking the passage of solar radiation. Moreover, even when water is irregularly supplied to the surface layer, desired water retentivity can be obtained. Since the water retention rate of the surface layer is 20% to 50% volume ratio, the continuity of capillary tube and desired strength are maintained. Further, since the specific gravity of the surface layer is 0.4 to 1.2, a desired tread pressure resistance, water retentivity, and water permeability are secured.

In the exterior heat insulation panel, the porous aggregate having an average particle diameter of 1 mm to 8 mm is mixed with the binding component and subjected to the compression molding, and the volume ratio of the binding component to the porous aggregate is 0.05 to 0.6.

In the exterior heat insulation panel having this structure, since water is retained in the void if the average particle diameter of the porous aggregate is smaller than 1 mm, the freeze-thaw resistance is deteriorated. On the other hand, if the average particle diameter of the porous aggregate is large, water permeability is improved, and if the average particle diameter exceeds 8 mm, strength of the exterior heat insulation panel is reduced. However, since the average particle diameter of the porous aggregate is 1 mm to 8 mm in the exterior heat insulation panel of the invention, the freeze-thaw resistance and the strength are not reduced. Furthermore, since the volume ratio of the binding component to the porous aggregate is 0.05 to 0.6, a desired tread pressure resistance, water retentivity, and water permeability are secured.

In the exterior heat insulation panel, the binding component includes at least one of a cement material, a magnesium oxide, and a liquid glass.

When the exterior heat insulation panel having this structure uses the cement material as the binding component, particularly, heating and calcination is not necessary in manufacturing the panel, the surface layer significantly improves in hydrophilicity, water resistance, heat resistance, ultraviolet degradation resistance, and strength. Also, when the magnesium oxide and the liquid glass are used as the binding component, strength, durability, and fire resistance of the surface layer are improved.

In the exterior heat insulation panel, the porous aggregate includes at least one of calcined diatomite particles, calcined clay porous particles, natural porous particles, continuous bubble-foamed glass particles, clinker ash particles, and calcined fly ash particles.

In the exterior heat insulation panel having this structure, both the continuous capillary tube structure continued in particles and the non-capillary tube void structure are obtained simultaneously.

In the exterior heat insulation panel, an amount of water absorbed by the heat-retaining board is $1.0 \text{ g}/100 \text{ cm}^2$ or less.

In the exterior heat insulation panel having this structure, the deterioration of heat insulation performance due to internal water absorption of the heat-retaining board is not prone to occur.

In the exterior heat insulation panel, the binding component includes an inorganic porous filler in which capillary tubes are continuous, the filler having the capillary tube structure therein and average particle diameter of 0.1 mm to 1.0 mm, and the volume ratio of the inorganic porous filler in which capillary tubes are continuous is 5% to 30% to the binding component.

In the exterior heat insulation panel having this structure, the inorganic porous filler in which capillary tubes are continuous does not deteriorate the strength and capillary tube continuity of the binding component, and capillary tube continuity in the surface layer is improved. Since the average particle diameter of the inorganic porous filler in which capillary tubes are continuous is 1.0 mm or less, the strength of the binding component is not deteriorated; also, since the volume ratio of the inorganic porous filler in which capillary tubes are continuous is 30% or less to the binding component, there is no deterioration of fluidity of the binding component. In contrast, when the average particle diameter of the inorganic porous filler in which capillary tubes are continuous is smaller than 0.1 mm, or when the volume ratio of the inorganic porous filler in which capillary tubes are continuous is less than 5% to the binding component, the above effects are not sufficiently exhibited.

In the exterior heat insulation panel, a first thin layer having a heat reflectivity and a thickness of 0.01 mm to 0.5 mm is provided on the exterior surface of the surface layer.

In this configuration, since the thickness of a first thin layer is 0.01 mm or more, a solar radiation reflection rate is not reduced; also, since the thickness of a first thin layer is 0.5 mm or less, there is no deterioration of water vaporization from the exterior surface of the surface layer.

In the exterior heat insulation panel, a second thin layer having a photocatalytic function and a thickness of 0.01 mm to 0.5 mm is provided on the exterior surface of the surface layer.

In the exterior heat insulation panel having this structure, hydrophilicity increases, and the solar radiation reflection rate of the exterior heat insulation panel, which activates an antifouling property by the solar radiation, is improved. In addition, since the thickness of a second thin layer is 0.01 mm or more, the antifouling property is not deteriorated.

According to the invention, it is possible to manufacture an inexpensive and lightweight exterior heat insulation panel having high strength, water retentivity, and freeze-thaw resistance. By cooling the surface layer using the vaporization heat of water and thus preventing temperature elevation of the structure, the energy-saving effect of the structure is drastically improved, and the structure is prevented from being deformed due to heat stress applied to the structure. Therefore, it is possible to extend the life of, for example, a structure or a waterproof layer. Moreover, the heat-retaining board under the surface layer is protected during fire or the like. Integration of the surface layer and the heat-retaining board makes it possible to perform installation easily and in a short time. Since the configuration of exterior heat insulation is simplified, the exterior heat insulation panel can also be used for the existing buildings which are limited in terms of load bearing.

Generally, in order to reduce a water-supply pump failure, it is preferable to periodically supply water to the surface layer. However, according to the exterior heat insulation panel of the invention, it is possible to lessen the burden of switching the water-supply pump by lengthening the interval in the water supply.

According to the exterior heat insulation panel of the invention, by imparting the water retentive function to the material and the water permeable function to the structure, it is possible to obtain both the high water retentivity and the freeze-thaw resistance simultaneously. The compression molding interconnects the porous aggregate having the capillary tube structure therein. In this manner, water in the surface layer moves to the exterior surface of the surface layer through the capillary tube and thus can be effectively vaporized. Moreover, since the interconnected aggregate forms a strong structure, it is possible to obtain high compression strength.

According to the exterior heat insulation panel of the invention, it is possible to obtain desired strength, shape retentivity, and fire resistance for a long time, without deteriorating water retentivity.

According to the exterior heat insulation panel of the invention, it is possible to lighten the panel, improve water retentivity, and enable water in the surface layer to move easily through the capillary tube.

According to the exterior heat insulation panel of the invention, a composite structure of the surface layer and the heat-retaining board is adopted. Accordingly, it is possible to maintain the heat insulation property for a long time, and particularly, to significantly improve compressibility with impact resistance of the surface layer and strength against bending due to external pressure from the surface layer.

According to the exterior heat insulation panel of the invention, the capillary tube continuity in the binding component is improved, and thus the capillary tube continuity between the porous aggregates is improved. Therefore, it is possible to increase vaporization amount of water from the exterior heat insulation panel and to improve a heat removal property.

According to the exterior heat insulation panel of the invention, imparting heat reflectivity to the exterior heat insulation panel makes it possible to suppress temperature elevation due to the solar radiation in summer in a structure.

According to the exterior heat insulation panel of the invention, imparting hydrophilicity makes it possible to promote efficient water vaporization from the entire exterior surface.

DETAILED DESCRIPTION OF THE INVENTION

In order to make water accumulated in the surface layer move inside the layer and to be constantly supplied to the exterior surface of the surface layer, that is, to the surface where water vaporizes, it is effective to use a method in which the porous aggregate having the continuous capillary tube structure is used, and the continuity of the capillary tube structure is also secured by means of the compression molding in the portion where the aggregates are interconnected. As a result of a thorough study, the present inventors determined types and ratio of the binding component and the various porous aggregate, and laminatedly integrated a noncombustible surface layer having capillary tube continuity and non-capillary tube void and a heat-retaining board which is a plate-shaped elastic body by compression molding. Accordingly, the inventors succeeded to obtain a lightweight exterior heat insulation panel having high water retentivity, water permeability, strength, and freeze-thaw resistance as well as a heat insulation function and a cooling function. Hereinbelow, an example of the exterior heat insulation panel according to the embodiment of the invention will be described with reference to FIGS. 1 to 3.

Figure 1:
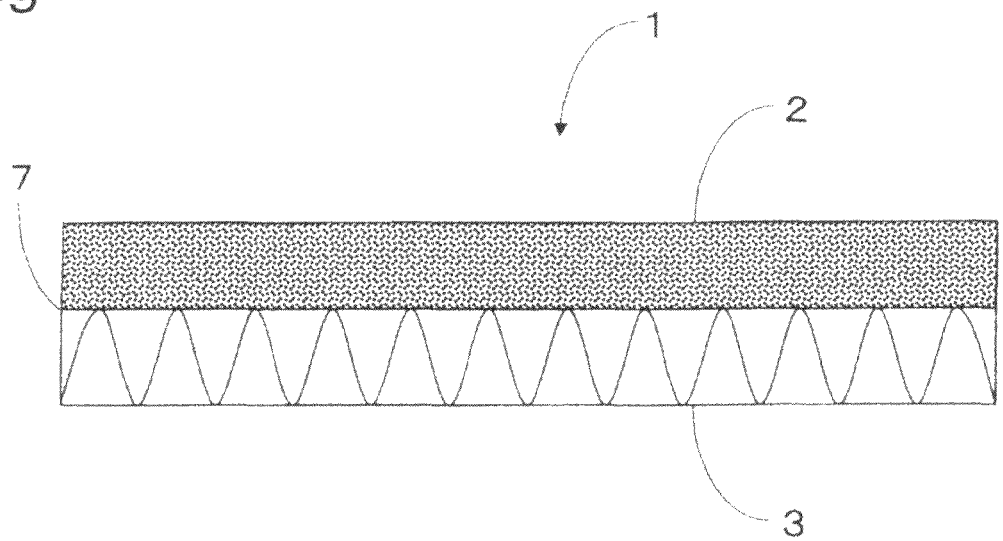
FIG. 1 is a schematic cross sectional view showing an example of an exterior heat insulation panel according to an embodiment of the invention.
Figure 2:
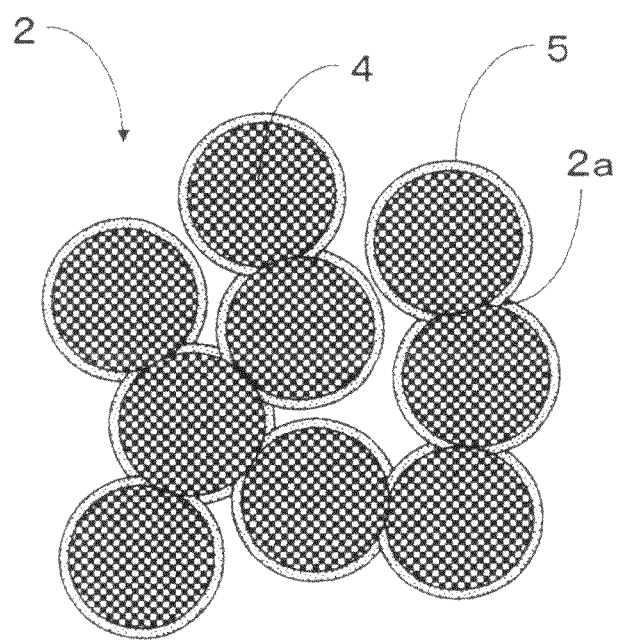
FIG. 2 is an enlarged schematic view showing a surface layer of an exterior heat insulation panel of the embodiment.
Figure 3:
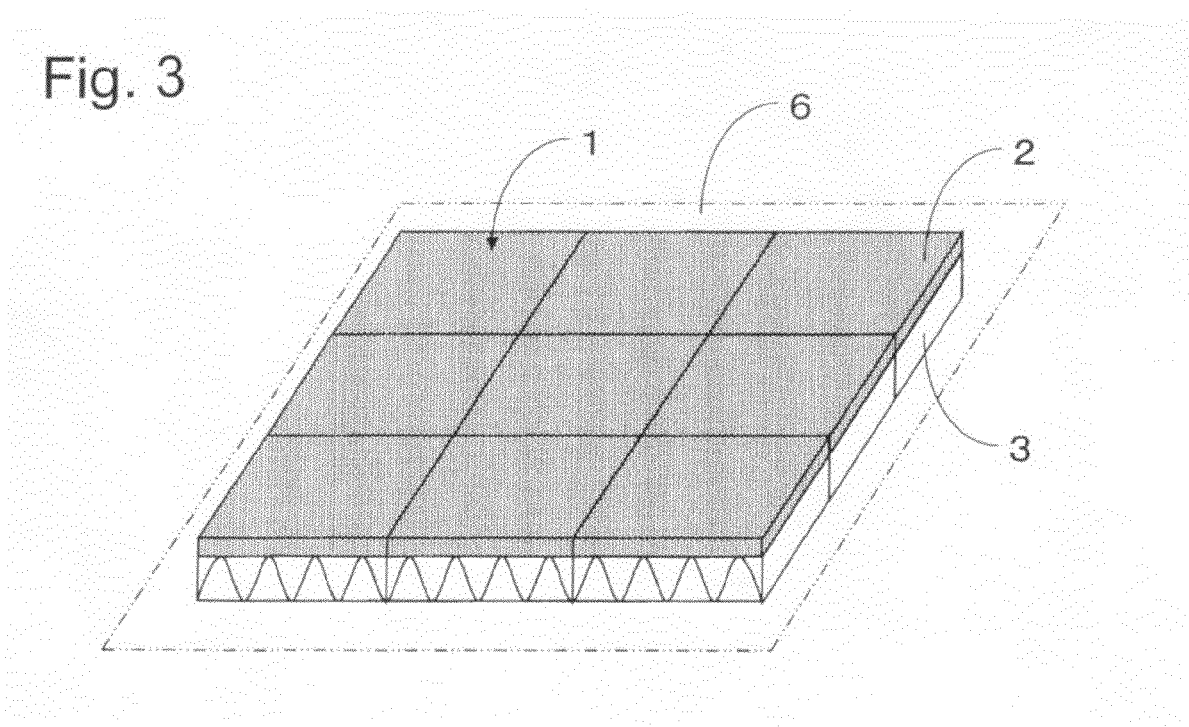
FIG. 3 is a schematic view showing a state where an exterior heat insulation panel of the embodiment is installed on the roof surface.

FIG. 1 is a schematic cross sectional view showing an exterior heat insulation panel according to the embodiment of the invention, and FIG. 2 is an enlarged schematic view showing a surface layer of the exterior heat insulation panel of the embodiment. Also, FIG. 3 is a schematic view showing a state where an exterior heat insulation panel of the embodiment is installed on the roof surface.

As shown in FIG. 1, an exterior heat insulation panel 1 is formed of a surface layer 2 and a heat-retaining board 3. The surface layer 2 is formed of porous aggregate interconnected by cement which is a binding component. In addition to the function of protecting the heat-retaining board 3 from solar radiation, the surface layer 2 also has a water retentive function, which is a feature of the invention, and water permeability resulting from the continuous capillary tube structure in the surface layer 2 and voids between the porous aggregates. Water is supplied to the surface or inside of the exterior heat insulation panel 1 by rain, water sprinkling, or water supplying, and then permeates into the entire surface layer 2, through the coarse void formed of, for example, cement which is a hydrophilic binding component and the porous aggregate, that is, through the void having the non-capillary tube void structure between particles. The water is then accumulated in the porous aggregate having continuous capillary tube structure in the surface layer 2. For example, on a sunny day in the summer, the water accumulated in the surface layer 2 begins to evaporate and then is supplied to the exterior surface of the surface layer 2 through the continuous capillary tube structure. At this time, temperature around the surface layer 2 drops remarkably due to the vaporization heat of water. For instance, in an experiment conducted by the inventors, after the surface layer 2 was sufficiently irrigated, the exterior heat insulation panel 1 was placed on a waterproofed asphalt roof, and subjected to a comparative measurement with a portion where the exterior heat insulation panel 1 was not installed. As a result, while the temperature rose to 74° C. in the existing waterproofed surface of the roof where the exterior heat insulation panel 1 had not been installed, the temperature was suppressed down to 44° C. on the surface layer 2 of the exterior heat insulation panel 1 (with the thickness of the heat-retaining board 3 being 50 mm and the thickness of the surface layer 2 being 20 mm) according to the invention; therefore, the effect of the invention was proved. Regarding the manufacturing method of the exterior heat insulation panel 1, the same method in the bending test and the falling ball test described later is applied. In this manner, in the exterior heat insulation panel of the invention, the solar radiation heat is actively removed, and the heat-retaining board protects the surface of the roof and walls of structure from the outside heat and cold.

The thinner the surface layer 2 constituting the exterior heat insulation panel 1 of the invention, the weaker the strength thereof. Particularly, when the surface layer 2 is thinner than 5 mm, light walking thereon becomes difficult, and the fireproof performance against external flames is deteriorated. Moreover, since the solar radiation passes through the surface layer 2, it is difficult to protect the heat-retaining board 3. In order to reduce a water-supply pump failure, it is preferable to periodically supply water to the surface layer 2. In this case, the surface layer 2 needs to have a water retaining ability of 2.5 L/m$^2$ to 30 L/m$^2$. However, such water retentive ability cannot be obtained when the surface layer 2 is thinner than 5 mm. For instance, when the water retention rate and thickness of the surface layer 2 are 50% and 5 mm respectively, the water retaining ability is 2.5 L/m$^2$.

In order to stably supply vaporizing water, it is necessary for the surface layer 2 have the water retentivity. That is, if the surface layer 2 has a high water retaining amount, it is possible to lengthen the interval in the water supply, and thus the burden of switching the water-supply pump is lessened. However, the practical upper limit of the water retention rate to maintain the strength of the surface layer 2 is generally 50% volume ratio. If the water retention rate is less than 20% of volume ratio, it is difficult to secure the capillary tube continuity described later. Accordingly, movement of water from the lower surface to the upper surface of the surface layer 2, which is caused by a capillary phenomenon, is inhibited, and thus the object of the invention cannot be achieved. Therefore, although it depends on the types and ratio of the binding component and the water retentive aggregate too, the water retention rate of the surface layer 2 of the invention is preferably 20% to 50% volume ratio.

The strength necessary for the surface layer 2 refers to the strength which enables light walking on the upper surface of the surface layer 2 when the exterior heat insulation panel 1 is placed on a floor. Specifically, the strength refers to the strength at which breaking does not occur in the falling ball test and the bending test described later in Embodiment 3 and the strength greater than a standard of 150 N.

It is preferable for the surface layer 2 to have a specific gravity of 0.4 to 1.2, and the reason is as follows. If the specific gravity of the surface layer 2 is smaller than 0.4, the tread pressure resistance becomes extremely poor, and thus breaking and defects occur on the surface layer 2 due to the collapse of the porous aggregate. Also, if the specific gravity of the surface layer 2 exceeds 1.2, not only is the water retention rate of the surface layer 2 extremely deteriorated, but also the water permeability of the surface layer 2 becomes extremely poor. Therefore, water supplied from the top of the slope cannot travel to the bottom rapidly and evenly, and the freeze-thaw resistance in the winter is deteriorated.

When the specific gravity and the thickness of the surface layer 2 are 0.6 and more than 60 mm respectively, the weight of dry surface layer 2 becomes 36 Kg/m². Accordingly, there is a concern that the exterior heat insulation panel 1 exceeds 40 Kg/m² overall. Usually, the exterior heat insulation panel 1 is carried by two people in many cases; however, if the weight of panel exceeds 40 Kg/m², it is difficult to carry the panel, and thereby the workability becomes poor. Therefore, it is preferable for the thickness of the surface layer 2 not to exceed 60 mm. Although it is possible to thicken the surface layer 2 to more than 80 mm, taking the load resistance of general structures into consideration, it is preferable for the surface layer 2 to have a water-containing mass of 130 Kg/m² or less.

The heat-retaining board 3 not only functions as a heat insulation material, but also contributes to strength improvement of the surface layer 2, which is a feature of the invention. Table 1 shows results of the bending test and the falling ball test. The bending test was performed based on JIS A 1408 (a strip-shaped specimen, distance between support points of 300 mm, test speed of 10 mm/min), and the impact test was performed based on JIS A 1408 (No. 5 specimen, 300 mm square, a falling ball weight of W2-1000, weight drop height of 200 mm, repetition number of test of 10 times). As the heat-retaining board 3, a foamed polystyrene heat-retaining board extruded to thickness of 50 mm (Kanelite Foam E3b, manufactured by Kaneka Corporation) was used. The surface layer 2 is obtained by coating calcined diatomite particles having an average diameter of 3 mm (ISOLITE CG 2, manufactured by ISOLITE Insulating Products, Co., LTD) with Portland cement (volume ratio of 0.4 volume parts of the Portland cement to 1 volume part of the calcined diatomite particles), and water (ratio of 0.33 weight ratio of water to 1 weight ratio of the Portland cement), and performing compression molding at 0.5 t/m², followed by drying. The thickness of surface layer 2 is 20 mm. The invention (the surface layer 2 and the heat-retaining board 3) is obtained by attaching the heat-retaining board 3 to the surface layer 2 finished with compression molding during drying. As shown in results of Table 1, it can be seen that bending strength of the invention has been remarkably improved compared to the surface layer alone. Generally, cement materials are strong against compression but vulnerable to tension. On the other hand, the heat-retaining board made of organic foamed resin is strong against tension but vulnerable to compression. In order to create a situation in which actual tread pressure is applied, the bending test was performed such that the surface layer 2 was compressed and the heat-retaining board 3 was under tension. It is thought that Table 1 shows results in which the surface layer 2 and the heat-retaining board 3 complement each other in their defects and mutually exhibit their advantages. In the falling ball test, breaking was not confirmed in the invention (the surface layer 2+the heat-retaining board 3), and this result can be described in the same aspect as the bending test. When the surface layer 2 and the heat-retaining board 3 are thickened, the strength in both the bending test and the falling ball test is improved. However, when the surface layer 2 is thickened, the weight increases upon water retention; therefore, it is preferable to adjust strength rather than change the thickness of heat-retaining board 3.

TABLE 1

| Specimen | Bending strength (N) | Ratio of number of specimens broken after falling ball test |
|---|---|---|
| Surface layer only | 41 | 40% |
| Heat-retaining board | 145 | 0 |
| Surface layer + heat-retaining board | 667 | 0 |

Material of the heat-retaining board 3 is not particularly limited so long as it is a foamed organic resin type of heat-retaining board with a closed pore rate of 90% or more, and as the board, it is possible to use foamed polystyrene, foamed polyethylene, foamed polyurethane, and the like. Here, when the amount of water absorption regulated by JIS A9511 exceeds 1.0 g/100 cm², the heat insulation performance will be significantly deteriorated in winter due to internal water absorption of the heat-retaining board 3. The amount of water absorption regulated by JIS A9511 is measured by a method in which a heat-retaining board sample has a size of 100 mm×100 mm×25 mm is immersed into water, and weight change before and after immersing is examined. That is, the amount of water absorption is measured by dividing by a unit area of the heat-retaining board sample.

The exterior heat insulation panel 1 can be manufactured by adhering the porous aggregate coated with cement or the like to the heat-retaining board 3, and integrating the resultant through compression, molding, and solidification. Since the cost and time is more reduced in this method compared to a method in which the individually manufactured surface layer 2 and heat-retaining board 3 are integrated by means of an adhesive, it is possible to realize low cost production. The surface layer 2 and the heat-retaining board 3 can be joined due to adhesive function of the binding component such as cement; however, when the surface layer 2 and the heat-retaining board 3 are integrated by compression molding, primer 7 (a primer) for improving adhesiveness of the surface layer 2 is coated on the surface of the heat-retaining board 3, a mixture of the porous aggregate and cement as the binding component is added thereto for compression molding, and as a result, strong joining can be established. Various resin mortars can be used as the primer 7. When the primer 7 is coated with thickness of 0.2 mm to 3 mm, adhesion stability and fireproof performance are improved. In this process, when the porous aggregate is used, since the porous aggregate of the surface layer 2 cuts into the surface of the heat-retaining board 3 (anchor effect), the adhesion surface increases, thereby obtaining an advantage that adhesive strength between the heat-retaining board 3 and the surface layer 2 is further enhanced. The surface layer 2 prepared beforehand may be integrated with the heat-retaining board 3 by pressure; however, since cement loses its adhesive function upon joining, it is necessary to use an adhesive too. The use of porous aggregate results in a concave and convex structure on the upper surface of the surface layer 2, and thus the contact area of the air increases compared to a flat panel; therefore, it is possible to extract more vaporization heat. In this condition, further increasing the contact area of the air by providing larger concavities and convexities on the exterior surface makes it possible to extract still more vaporization heat.

As shown in FIG. 2, in the surface layer 2, the porous aggregates 4 coated with cement 5 as the binding component are in direct contact with each other at various places through a contact portion 2a. As the material of porous aggregate 4, calcined diatomite particles, calcined clay porous particles, natural porous particles, continuous bubble-foamed glass particles, clinker ash particles, and fly ash particles, which have continuous air bubbles or a void structure in the particles, may be used. The calcined diatomite particles refer to particles obtained by calcining diatomaceous earth molded into a particle shape at about 1000° C., or, products obtained by pulverizing and classifying diatomaceous earth as a raw material, formed into fireproof brick, and examples thereof include ISOLITE CG 2 manufactured by ISOLITE Insulating Products, Co., LTD. The natural porous particles refer to natural products such as Bora soil, vermiculite, Shirasu, and pearlite, or particles imparted with a porous structure through heating treatment of natural products. The natural porous particles also refer to particles having capillary tube voids therein, and they can form the continuous capillary tube structure on the top and bottom as well as the left and right inside the surface layer 2. The calcined clay porous particles are particles obtained by a heating treatment and granulation of raw materials such as clay soil, and the particles can also use active sludge discharged from sewage works or the like as the raw material. The clinker ash particles are cakes obtained by making a mixture of mineral raw materials into a semi-molten state, and cement clinker or magnesia clinker is an example thereof. The fly ash particles are porous particles obtained by making coal ash generated in a thermal power plant into particles by calcinations.

As described above, when manufacturing the exterior heat insulation panel 1, by pressurizing the surface layer 2 and the heat-retaining board 3, the porous aggregates 4 in the surface layer 2 contact each other, and thereby the capillary tube continuity is secured from the lower surface to the upper surface of the surface layer 2. As a result, due to capillary phenomenon, water climbs to the upper surface from the lower surface of the surface layer 2, and the water can evaporate from the upper surface of the surface layer 2 accordingly. When the calcined diatomite particles having average diameter of 3 mm were used, it was possible to lift water up to about 100 mm without problems.

As described above, the capillary tube continuity is a property in which the capillary tube continues from the lower surface to the upper surface of the surface layer 2 since the porous aggregates 4 of the surface layer 2 contact each other. Particularly, the structure of the surface layer 2 having the capillary tube continuity is referred to as the continuous capillary tube structure.

The porous aggregate 4 forming the continuous capillary tube structure can be easily confirmed and selected by the following method. That is, the porous aggregate 4 is filled into a transparent cylinder having a bore diameter of about 50 mm and length of about 200 mm, and an end of the cylinder is covered with a mesh through which the porous aggregate 4 cannot pass. Subsequently, the cylinder is repeatedly dropped from a height of 50 mm to a flat plate 20 times, and while the filling state is stabilized, the cylinder is immersed into a sufficiently large tray (1 $m^2$ or larger) containing water with depth of about 10 mm from the mesh. 24 hours later, the distance (water lifting height) between the moistened upper surface of the porous aggregate 4 and the surface of water in the tray is measured. It is difficult in some cases to confirm the upper surface (the moistened upper surface) to which water is lifted due to the continuous capillary tube structure, from the color of porous aggregate 4. In this case, properly dissolving dye having a low surface activation property into water enables more precise measurement. For example, when the thickness of surface layer 2 is 30 mm, in consideration of the shape of the materials and variation in molding and variation of water-lifting speed, it is preferable to increase the safety rate to 1.5 times and use the porous aggregate 4 having a water lifting height exceeding 45 mm. In this context, since the calcined diatomite particles have a water lifting height of 200 mm or higher, the particles can be mentioned as one of the most suitable ones as the porous aggregate 4 of the exterior heat insulation panel 1.

It is necessary for the binding component to function to fix the porous aggregate 4. It is also necessary for the binding component to include such material and structure that the binding component can maintain its structure even when a load is applied to the exterior heat insulation panel 1. In addition, it is preferable that the binding component does not require, particularly, heating and calcination during manufacturing the panel, is excellent in hydrophilicity, water resistance, heat resistance, ultraviolet degradation resistance, and strength, and can be cured at normal temperature. Accordingly, the cement 5 is used as the binding component in the Embodiment 1. Also, in the invention, the porous aggregate 4 is coated with the cement 5 and fixed through the contact portion 2.

The exterior heat insulation panel 1 including such a structure has strong pressure resistance due to the skeletal structure of the porous aggregate 4. As described later, it is necessary for the exterior heat insulation panel 1 to have water permeability. In the Embodiment 1, since the void not including capillary tubes, that is, the non-capillary tube void structure is formed between the porous aggregate 4, water permeability is secured. As the binding component, it is possible to use magnesium oxide or silicate-based inorganic materials such as liquid glass instead of the cement 5. However, materials with extremely high alkalinity are not preferable, and when the inorganic binder is used, materials close to neutral pH are preferable. Cement, magnesium oxide, and liquid glass are alkaline, but they are neutralized over time; therefore, these materials can be used safely. When the exterior heat insulation panel 1 of the invention is installed on the folded-plate roof or bay, the panel 1 needs to be more strengthened and is a little expensive compared to the cement materials. However, the use of a binding component such as magnesium oxide and liquid glass makes it possible to satisfy the requirements. The durability and fire-resistance are also improved due to the binding component using magnesium oxide and liquid glass. Also, the liquid glass can be mixed in various manners, and has an advantage of adjusting the mixing depending on usage purposes. Moreover, resin mortar and resin based on polyurethane, epoxy, acryl, or siloxane may also be used for example. In the exterior heat insulation panel 1 of the invention, the impact load is mitigated due to the elastic deformation of resin, but in some cases, a hydrophilicity treatment should be performed by using additives because of strong hydrophobicity. The greater the organic material component, the lower the noncombustibility and the fire-resistance; accordingly, it is better for the organic material component to be added in as small an amount as possible. In any cases, it is preferable for the binding component to have a high hydrophilicity.

It is possible to mix reinforcement fibers, whiskers, surfactant, water reducing agent, foaming agent, and quick setting agent with the binding component. Also, an inorganic porous filler in which capillary tubes are continuous including the capillary tube structure, such as diatomaceous earth, can be mixed with the binding component to improve capillary tube continuity in the surface layer 2. Unlike the aggregate, the inorganic porous filler in which capillary tubes are continuous is kneaded into the binding component, thereby adding capillary tube continuity to the binding component itself. When the filer is added to the binding component, generally overall viscosity of the binding component increases, and when the inorganic porous filler in which capillary tubes are continuous is used, the viscosity of binding component further increases because the filler absorbs water. Therefore, viscosity can be adjusted by increasing the amount of water to be added, adding a small amount of surfactant, and introducing fine air bubbles generated by stirring. Using the inorganic porous filler in which capillary tubes are continuous increases the capillary tube continuity of the entire surface layer 2 and increases ratio of the binding component to the aggregate, whereby the overall strength of the surface layer 2 and the exterior heat insulation panel 1 increases. In addition, using the combination of reinforcement fibers and the whiskers as the filler makes it possible to improve the strength.

In order not to inhibit the strength and fluidity of the binding component, it is preferable for the average particle diameter of the inorganic porous filler in which capillary tubes are continuous to be 0.1 mm to 1.0 mm, and the mixing amount of the inorganic porous filler in which capillary tubes are continuous is preferably 5% to 30% of the binding component in terms of volume ratio. The ratio of the binding component to the porous aggregate 4 is preferably 0.05 to 0.6 in terms of volume ratio. If the volume ratio of the binding component is less than 0.05, the tread pressure resistance becomes extremely poor, and cracks and defects occur on the surface layer 2 due to the collapse of the porous aggregate. If the volume ratio of the binding component exceeds 0.6, the void in the non-capillary tube void structure decreases, hence not only the water retention rate of the surface layer 2 extremely decreases, but also the water permeability of the surface layer 2, which will be described later, is extremely deteriorated. Accordingly, there is a concern that supplied water will not be rapidly and evenly provided to the entire surface layer, water retentivity between the porous aggregate 4 and continuity of water in the capillary tube will be deteriorated, and freeze-thaw resistance will also be deteriorated in winter.

The voids of non-capillary tube, that is, non-capillary tube structure is established between the porous aggregate 4, whereby a water permeable structure is established. As a result, the void improves penetrability of water supplied by rain, water sprinkler, or water supply system and configures a retreat of water in the porous aggregate 4 upon freezing. When the average particle diameter of the porous aggregate 4 is smaller than 1 mm, water is retained in the void, and thus the freeze-thaw resistance is deteriorated. The larger the average particle diameter of the porous aggregate 4, the better the water permeability; however, when the average particle diameter exceeds 8 mm, the strength of the exterior heat insulation panel 1 is lowered. Therefore, it is advantageous that the average particle diameter of the porous aggregate 4 is 1 mm to 8 mm, preferably 1 mm to 6 mm. In the exterior heat insulation panel 1 of the embodiment, the surface layer 2 has the water retentive function because of the material and the water permeable function because of the structure; therefore, it is possible to obtain the high water retentivity, rapidness and evenness in supplying water, and the freeze-thaw resistance all together. When the freeze-thaw test (based on JIS A 1148) was actually performed, it was confirmed that the water retentivity and strength were not deteriorated for 100 cycles of testing. As described above, the void between particles of the porous aggregate 4 functions as water permeable path. Accordingly, by making a slight slope as well as a vertical surface, water supplied from the water source moves along the surface layer 2 portion, and is supplied to be retained in the entire surface; also, due to capillary migration, the water is promoted to evaporate from the exterior surface of the surface layer 2.

As shown in FIG. 3, the exterior heat insulation panel 1 of the embodiment can be easily installed by laying some sheets of panel 1 as desired in horizontal direction. For example, when the panel 1 is installed on the concrete slab of the roof, the easiest fixing method is to use an adhesive. Also, when the panel 1 is installed on the urethane waterproof layer or the like, foamed polyurethane resin is applied thereon, and before the foamed polyurethane resin is solidified, the panel 1 is laid. No matter what kind of roof surfaces is subjected to the installation, in order to cause evaporation from wide area for a long time and stably, it is preferable to install a water sprinkling device, or, to install a water supplying device as a water source. In this case, water sprinkling and water supplying is controlled by one of a timer, a temperature sensor, or a water sensor. As described above, according to the invention, on a slight slope as well as a vertical surface of the surface layer 2, the water supplied from the water source rapidly moves through the surface layer 2 due to the water permeable function and then is supplied to and retained in the entire surface. Also, due to capillary migration, the water is promoted to evaporate from the exterior surface of the surface layer 2.

In the exterior heat insulation panel of the embodiment, the exterior surface of the surface layer 2 becomes a concavo-convex surface due to the porous aggregate 4, whereby the evaporation area is enlarged. Therefore, in cooperation with the hydrophilicity of the cement 5, the amount of water to evaporate from the exterior surface increases, and the cooling effect is further enhanced. By performing water sprinkling and water supplying, the surface layer 2 is constantly cooled due to the vaporization heat of water. Accordingly, due to the prevention of temperature elevation in the summer, the energy-saving effect in a structure is expected, and it is possible to extend the life of the structure by preventing the heat stress variation to the structure. It is also expected that the surface layer 2 in a dry state has a heat insulation function in the winter without water sprinkling. In the surface layer 2, since the void ratio is high and heat conductivity and specific heat are low, the fireproof performance is also high.

The exterior heat insulation panel 1 of the embodiment can be manufactured by the following method. First, before being poured into a mold, a mixture of cement 5 (Portland cement) and water (1:0.33 in terms of weight ratio) is mixed with a general white filler such as titanium white powder for coating materials and heat reflexive hollow beads (seemingly 0.3 to 1 of Portland cement in a volume ratio). Subsequently, the mixture is sprayed to 0.5 mm to coat the bottom of the mold, the mixture of cement 5 and water is then mixed with the porous aggregate 4, followed by stirring, and then poured into the mold. Further, the heat-retaining board 3 made of extruded and foamed polystyrene is superimposed thereon, followed by compression molding, and is dried. According to this method, it is possible to prepare an exterior heat insulation panel 1 that has a high solar radiation reflection rate. The exterior heat insulation panel 1 can also be post-coated. However, in any case, when the thin layer is thinner than 0.01 mm, the solar radiation reflection rate is extremely reduced. On the other hand, when the thin layer is thicker than 0.5 mm, vaporization of water from the exterior surface of the surface layer 2 is inhibited, and the solar radiation reflection rate is hardly improved. By using white cement as the cement used for manufacturing the surface layer 2, it is possible to increase the solar radiation reflection rate. Also, adding the anatase-type titanium oxide powder to the configuration increases the solar radiation reflection rate and the hydrophilicity, and makes it possible to prevent the exterior surface of the surface layer 2 from being contaminated with organic materials or algae for example. The hydrophilicity and antifouling property of the anatase-type titanium oxide are activated due to solar radiation; however, if the thin layer is thinner than 0.01 mm, the antifouling property is deteriorated. On the other hand, even if the thin layer is thicker than 0.5 mm, almost no improvement in performance is confirmed.

According to the invention, the exterior heat insulation panel 1 can be installed on the surface of the roof and walls of a structure to reduce energy for air-conditioning the structure and protect the structure against heat stress; also, the exterior heat insulation panel 1 can be applied to the water retentive pavement on which light walking is performed as a countermeasure against heat island.

What is claimed is:

1. An exterior heat insulation panel installed on the surface of a roof or walls of a structure, the exterior heat insulation panel comprising:
    a surface layer having a continuous capillary tube structure and a non-capillary tube void structure, the continuous capillary tube structure being made of particles of porous aggregate combined by a hydrophilic binding component and the non-capillary tube void structure being formed between the particles of the porous aggregate; and
    a foamed organic resin type of heat-retaining board having closed pores,
    wherein the heat-retaining board and the surface layer are integrated by compression molding and
    wherein the porous aggregate having an average particle diameter of 1 mm to 8 mm is mixed with the binding component and subjected to the compression molding, and the volume ratio of the binding component to the porous aggregates is 0.05 to 0.6.

2. The exterior heat insulation panel according to claim 1, wherein a thickness of the surface layer is 5 mm to 60 mm, a water retention rate of the surface layer is 20% to 50% in terms of volume ratio, and a specific gravity of the dry surface layer is 0.4 to 1.2.

3. The exterior heat insulation panel according to claim 1, wherein the binding component includes at least one of a cement material, a magnesium oxide, and liquid glass.

4. The exterior heat insulation panel according to claim 1, wherein the porous aggregate includes at least one of calcined diatomite particles, calcined clay porous particles, natural porous particles, continuous bubble-foamed glass particles, clinker ash particles, and calcined fly ash particles.

5. The exterior heat insulation panel according to claim 1, wherein an amount of water absorbed by the heat-retaining board is 1.0 g/100 cm$^2$ or less.

6. The exterior heat insulation panel according to claim 1, wherein the binding component includes an inorganic porous filler in which capillary tubes are continuous, the filler having a capillary tube structure therein and average particle diameter of 0.1 mm to 1.0 mm, and the volume ratio of the inorganic porous filler in which capillary tubes are continuous is 5% to 30% to the binding component.

7. The exterior heat insulation panel according to claim 1, wherein a first thin layer having a heat reflectivity and a thickness of 0.01 mm to 0.5 mm is provided on the exterior surface of the surface layer.

8. The exterior heat insulation panel according to claim 1, wherein a second thin layer having a photocatalytic function and a thickness of 0.01 mm to 0.5 mm is provided on the exterior surface of the surface layer.

* * * * *